US010288017B1

(12) United States Patent
Romanato (10) Patent No.: US 10,288,017 B1
(45) Date of Patent: May 14, 2019

(54) MODEL BASED CONTROL TO MANAGE EDOC TEMPERATURE

(71) Applicant: GM GLOBAL TECHNOLOGY OPERATIONS LLC, Detroit, MI (US)

(72) Inventor: Roberto Romanato, Settimo Torinese (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/793,316

(22) Filed: Oct. 25, 2017

(51) Int. Cl.
| | |
|---|---|
| *F02M 26/49* | (2016.01) |
| *F02D 41/00* | (2006.01) |
| *F02M 26/05* | (2016.01) |
| *F02M 26/47* | (2016.01) |

(52) U.S. Cl.
CPC ......... *F02M 26/49* (2016.02); *F02D 41/0072* (2013.01); *F02M 26/05* (2016.02); *F02M 26/47* (2016.02); *F02D 2200/0804* (2013.01)

(58) Field of Classification Search
CPC ........ F02D 41/12; F02D 41/126; F02D 41/30; B01D 53/30; B01D 53/8689; F02M 26/49
USPC ........... 701/102–105, 107, 109; 60/272, 275, 60/285, 286, 299
See application file for complete search history.

(56) References Cited

U.S. PATENT DOCUMENTS

| | | | | |
|---|---|---|---|---|
| 5,600,947 A * | 2/1997 | Cullen | ................... | F01N 3/2013 60/274 |
| 2004/0244364 A1* | 12/2004 | Makki | ................... | F01N 11/002 60/285 |
| 2005/0150212 A1* | 7/2005 | Pfaeffle | ................... | F01N 3/035 60/286 |
| 2006/0137665 A1* | 6/2006 | Khair | ................... | F02M 26/05 123/568.12 |
| 2007/0125069 A1* | 6/2007 | Storhok | ................... | F01N 11/00 60/285 |
| 2012/0134276 A1* | 5/2012 | He | ................... | H04L 1/1607 370/242 |
| 2013/0060449 A1* | 3/2013 | Bagnasco | ........... | F02D 41/0085 701/103 |
| 2013/0231846 A1* | 9/2013 | Magner | ............... | F02D 41/1441 701/108 |
| 2015/0066336 A1* | 3/2015 | Magner | ............... | F02D 41/1454 701/104 |
| 2016/0061131 A1* | 3/2016 | Santillo | ............... | F02D 41/0295 60/274 |
| 2018/0094563 A1* | 4/2018 | Magner | ..................... | F01N 3/20 |

* cited by examiner

*Primary Examiner* — John Kwon
*Assistant Examiner* — Johnny H Hoang
(74) *Attorney, Agent, or Firm* — Cantor Colburn LLP (57) ABSTRACT

Described herein is a system and method of controlling an emissions control system for treating exhaust gas in a motor vehicle having an internal combustion engine. The emissions control system includes an electric diesel oxidation catalyst (eDOC) device having an electric heating element, disposed in a stream of the exhaust gas, a temperature sensor disposed at the eDOC device and configured to detect a temperature of the exhaust gas, and a controller that is configured to perform a model based control of the eDOC device based on a dual nested closed loop topology having an inner closed loop control and an outer closed loop control. The inner closed loop control is configured to control the power required for the eDOC device and outer closed loop control is configured to control the temperature of the eDOC device.

20 Claims, 5 Drawing Sheets

MODEL BASED CONTROL TO MANAGE EDOC TEMPERATURE

The present disclosure relates to exhaust systems for internal combustion engines, and more particularly to exhaust systems using a diesel oxidation catalyst (DOC) and a selective catalytic reduction (SCR) device for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components. An exhaust gas treatment system typically includes one or more treatment devices, such as oxidation catalyst (OC) devices, selective catalyst reduction devices, particulate filters, mixing elements and urea/fuel injectors.

An oxidation catalyst device is provided in an exhaust system to treat unburned gaseous and non-volatile hydrocarbon (HC) and carbon monoxide (CO). The oxidation catalyst oxidizes the HC and CO under high temperature conditions to form carbon dioxide ($CO_2$) and water ($H_2O$). If the oxidation catalyst overheats, its ability to oxidize the HC and CO is affected and its performance and longevity may be degraded. Accordingly, it is desirable to provide methods and systems that monitor the operation of the oxidation catalyst and prevent overheating.

SUMMARY

Described herein is a system and method of controlling an emissions control system for treating exhaust gas in a motor vehicle including an internal combustion engine. The emissions control system includes an electric diesel oxidation catalyst (eDOC) device having an electric heating element, disposed in a stream of the exhaust gas, a temperature sensor disposed at the eDOC device and configured to detect a temperature of the exhaust gas, and a controller that is configured to perform a model based control of the eDOC device based on a dual nested closed loop topology having an inner closed loop control and an outer closed loop control. The inner closed loop control is configured to control the power required for the eDOC device and outer closed loop control is configured to control the temperature of the eDOC device.

In addition to one or more of the features described above, or as an alternative, further embodiments may include a temperature sensor and another NOx sensor.

In addition to one or more of the features described above, or as an alternative, further embodiments may include that the inner closed loop control employs a virtual sensor for the eDOC device responsive to at least a temperature of the engine and a flow of the exhaust gas.

In addition to one or more of the features described above, or as an alternative, further embodiments may include that the inner closed loop control exhibits a bandwidth at least one of higher than the outer closed loop, twice that of the outer closed loop, five times that of the outer closed loop, and ten times that of the outer closed loop.

In addition to one or more of the features described above, or as an alternative, further embodiments may include that at least one of the inner closed loop control and the outer closed loop control employs a proportional, integral, and derivative PID control.

In addition to one or more of the features described above, or as an alternative, further embodiments may include that the outer closed loop control employs a limit function based on operational and performance constraints of the eDOC device.

In addition to one or more of the features described above, or as an alternative, further embodiments may include that the operational and performance constraints include at least one of eDOC device temperature, its gradient, and flow of the exhaust gas.

In addition to one or more of the features described above, or as an alternative, further embodiments may include that at least one of the inner closed loop control and the outer closed loop control is configure to permit operation of the eDOC device independent of a flow of the exhaust gas.

In addition to one or more of the features described above, or as an alternative, further embodiments may include that the eDOC device includes an electric heater integrated with a diesel oxidation catalyst in a single package.

In addition to one or more of the features described above, or as an alternative, further embodiments may include a particulate filter located downstream in the exhaust gas of the eDOC device.

In addition to one or more of the features described above, or as an alternative, further embodiments may include a selective catalyst reduction (SCR) device and a NOx sensor disposed in the exhaust gas downstream from the SCR device.

In addition to one or more of the features described above, or as an alternative, further embodiments may include that the eDOC device is configured to regenerate at least one of the eDOC device, a DOC device, a particulate filter, and an SCR device.

In addition to one or more of the features described above, or as an alternative, further embodiments may include that at least two of the eDOC device, DOC device, particulate filter and SCR device are integral.

Also described herein in another embodiment is an exhaust system for treating exhaust gas emitted by an internal combustion engine. The exhaust system includes an electric diesel oxidation catalyst (eDOC) device disposed in a stream of the exhaust gas of the internal combustion engine, a temperature sensor disposed at the eDOC device and configured to detect a temperature of the exhaust gas, and a controller that is configured to perform a model based control of the eDOC device based on a dual nested closed loop topology having an inner closed loop control and an outer closed loop control. Where the inner closed loop control is configured to control the power required for the eDOC device and the outer closed loop control is configured to control the temperature of the eDOC device.

Moreover, described herein in yet another embodiment is a computer-implemented method for controlling an electric oxidation catalyst (eDOC) device of an exhaust system of an internal combustion engine. The method includes measuring an exhaust gas temperature associated with the eDOC device and performing a model based control of the eDOC device based on a dual nested closed loop topology having an inner closed loop control and an outer closed loop control. The method also includes configuring the inner closed loop to control a power required for the eDOC device, configuring the outer closed loop to control the temperature of the eDOC device, and generating a command to the eDOC device based on the performing.

In addition to one or more of the features described above, or as an alternative, further embodiments may include that the inner closed loop control further includes employing a virtual sensor for the eDOC device responsive to at least a temperature of the engine and a flow of the exhaust gas.

In addition to one or more of the features described above, or as an alternative, further embodiments may include that the inner closed loop control exhibits a bandwidth at least one of higher than the outer closed loop, twice that of the outer closed loop, five times that of the outer closed loop, and ten times that of the outer closed loop.

In addition to one or more of the features described above, or as an alternative, further embodiments may include that at least one of the inner closed loop control and the outer closed loop control is configured to permit operation of the eDOC device independent of a flow of the exhaust gas.

In addition to one or more of the features described above, or as an alternative, further embodiments may include regenerating at least one of the eDOC device, a DOC device, a particulate filter, and an SCR device.

In addition to one or more of the features described above, or as an alternative, further embodiments may include the outer closed loop control employing a limit function based on operational and performance constraints of the eDOC device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e., two, three, four, five, etc. The term "connection" can include an indirect "connection" and a direct "connection".

Figure 1:
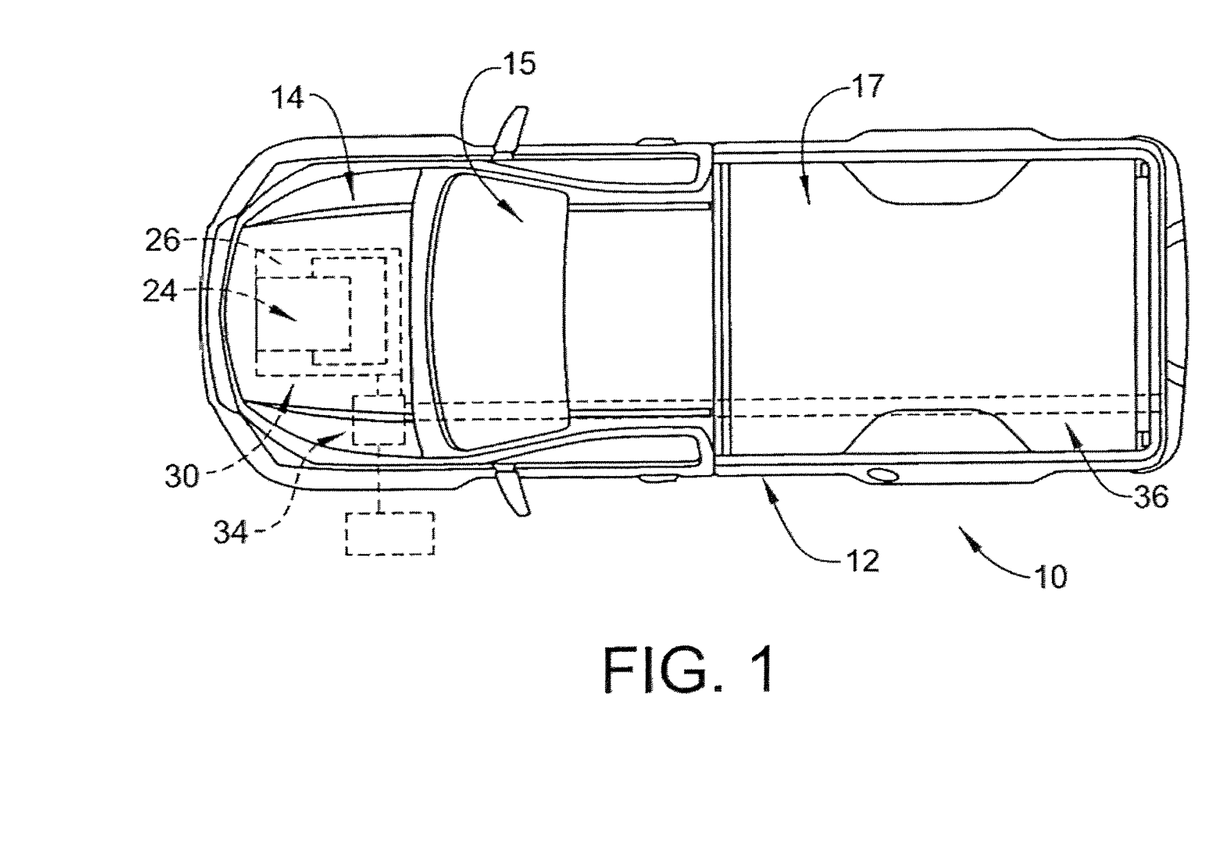
FIG. 1 depicts a motor vehicle including an internal combustion engine and an emission control system according to one or more embodiments.

A motor vehicle, in accordance with an aspect of an embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the illustrative embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 24 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
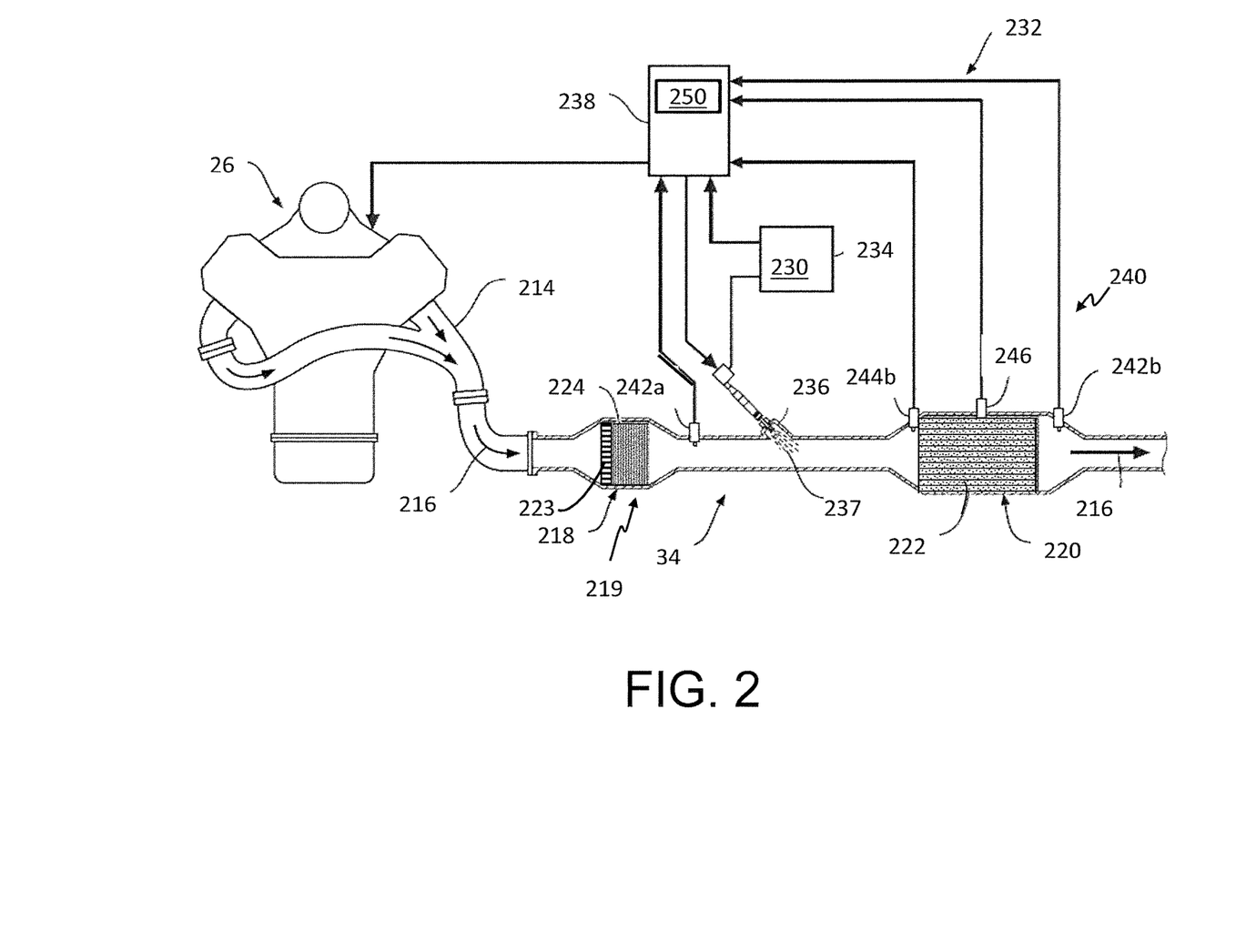
FIG. 2 illustrates example components of an emissions control system according to one or more embodiments.

FIG. 2 illustrates example components of the emissions control system 34 according to one or more embodiments. It should be noted that while the ICE system 24 includes a diesel engine 26 in the above example, the emissions control system 34 described herein can be implemented in various engine systems. The emissions control system 34 facilitates the control and monitoring of unburned gaseous and non-volatile hydrocarbon (HC) and carbon monoxide (CO) as well as $NO_x$ storage and/or treatment materials, to control exhaust produced by the ICE system 24. For example, the emissions control system 34 may employ an oxidation catalyst to oxidize the HC and CO under high temperature conditions to form carbon dioxide ($CO_2$) and water ($H_2O$). In addition, the emissions control system may employ various methodologies for controlling selective catalytic reduction (SCR) devices, and appurtenant $NO_x$ sensors, where the SCR devices are configured to receive exhaust gas streams from the ICE system 24 and control $NO_x$ emissions therefrom. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR devices are configured to receive reductant, such as at variable dosing rates as will be described below.

The exhaust gas conduit 214, which may comprise several segments, transports exhaust gas 216 from the diesel engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of SCRs in addition to particulate filtering capabilities. Alternatively, or in addition, the SCR device 220 can also be coated on a flow through substrate. As can be appreciated, system 34 can include various additional treatment devices, including a diesel oxidation catalyst (DOC) device 218, and particulate filter devices, among others whether in separate packages or integrated.

As can be appreciated, the DOC device 218 can be of various flow-through, oxidation catalyst devices known in the art. The DOC device includes an oxidation catalyst designed to oxidize carbon monoxide, gas phase hydrocarbons, and the soluble organic faction (SOF) of diesel particulate matter to $CO_2$ and $H_2O$. In various embodiments the DOC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The DOC device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. The DOC device 218 may also oxidize a portion of the nitrogen oxide (NO) to nitrogen dioxide ($NO_2$). The DOC device 218 may also incorporate a zeolite component into the washcoat to trap or store hydrocarbons that would otherwise be emitted at low temperatures (e.g., during a cold start or engine idling—below 200 degrees Celsius). In embodiments, the zeolite component of the OC device 218 includes zeolite-Beta (Ti-Beta) and/or zeolite-SSZ-33 (Ti-SSZ-33).

The SCR device 220 may be disposed downstream from the DOC device 218 in the exhaust system 30. In one or more examples, the SCR device 220 may include a filter portion 222 that can be a wall flow filter, which is configured to filter or trap carbon and other particulate matter from the exhaust gas 216. In at least one embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc.

In another embodiment, the particulate filter (PF) 222 may be disposed upstream/downstream of the SCR device 220. The PF 222 operates to filter the exhaust gas 216 of carbon and other particulates. As stated above, in embodiments, the PF 222 may be constructed using a ceramic wall flow monolith filter that is packaged in a rigid shell or canister having an inlet and an outlet in fluid communication with exhaust gas conduits. The ceramic wall flow monolith filter may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 216 entering the PF 222 through the inlet ends of the inlet passages is forced to migrate through adjacent longitudinally extending walls to the outlet passages. It is through this exemplary wall flow mechanism that the exhaust gas 216 is filtered of carbon (soot) and other particulates. The filtered particulates are deposited on the longitudinally extending walls of the inlet passages and, over time, will have the effect of increasing the exhaust gas backpressure experienced by the exhaust system 34 and the ICE 24. To address these concerns, the emissions control system 34 may also perform a cleaning or regeneration process of the PF 222 to reduce backpressure as described herein in one or more examples. In one embodiment, one method of regeneration involves the oxidation, or burning, of accumulated carbon and other particulates in what is typically a high temperature (>600° C.) environment.

The DOC device 218, the SCR device 220 and the PF 222 may each have a selected operating temperature at which the device effectively and efficiently removes particulates or alters the exhaust gas 216. For example, the SCR device 220 has an operating temperature for exhaust gas 216 received at which the device converts NO to $N_2$ at or above the selected temperature. In addition, the DOC device 218 may be used to combust HC in an exothermic reaction that is effective to combust the accumulated particulates in the PF 222. Initiation of the PF 222 regeneration typically occurs at a selected operating temperature, where an exothermic reaction caused by high exhaust gas temperature combusts or oxidizes accumulated particulates.

At engine start up, the exhaust gas treatment devices may be at or near ambient temperature, which is typically too low for effective operation of such devices in the emission control system 34. In addition, the temperatures of the exhaust gas treatment devices of the exhaust system 30, under normal engine operation, do not exceed their respective normal operational temperatures, which are too low for effective regeneration. The temperatures of the exhaust gas treatment devices are therefore increased by driving up the temperature of the exhaust gases 216, when necessary. In some systems a HC injector may be employed to inject additional fuel upstream of the DOC device 218 so that the fuel burns in the DOC device 218 to temporarily increase the exhaust gas temperature. Alternatively or conjunctively, a post injection strategy may be employed to temporarily increase the exhaust gas temperature by injecting additional fuel into the cylinder(s) of the ICE 24. In another embodiment, an electric DOC (eDOC) device 223 is employed that includes the capability of adding thermal energy to the exhaust gases 216 as needed for regeneration and/or improved operation of the emission control system 34 as will be described further herein.

Figure 3A:
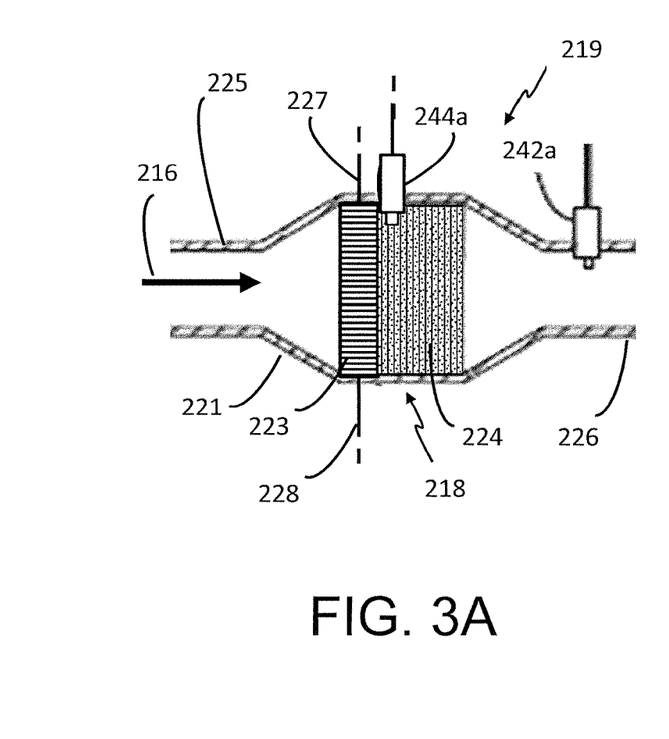
FIG. 3A illustrates an expanded depiction of an eDOC device in accordance with one or more embodiments.
Figure 3B:
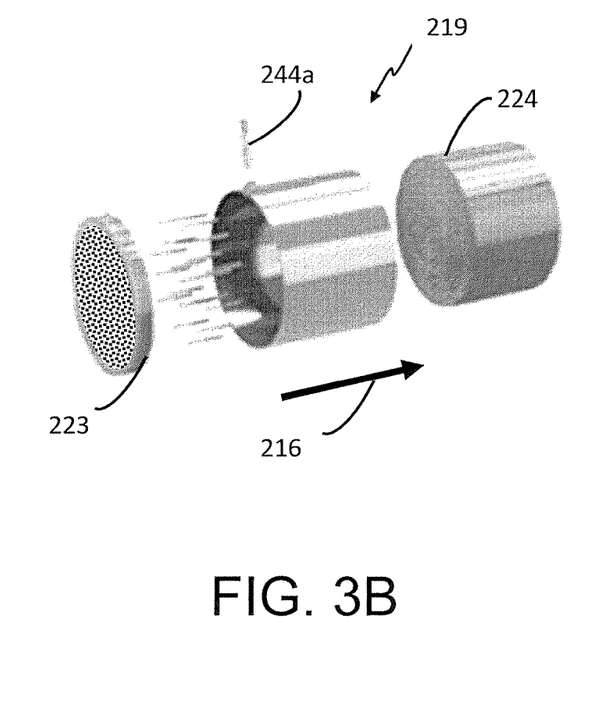
FIG. 3B illustrates a simplified perspective depiction of an eDOC device in accordance with one or more embodiments.

Turning now to FIGS. 3A and 3B and with continued reference to FIGS. 1 and 2, in some embodiments, the emission control system 34 also includes an eDOC device 219. The eDOC device 223 is disposed in the stream of exhaust gas 216 upstream of the DOC device 218 and the SCR device 220. In an embodiment the eDOC device 223 is disposed in the housing 221 that substantially encloses substrate 224. The substrate 224 may be made of metal, however other materials are possible. The housing 221 may be generally cylindrical or have any other shape that permits the flow of exhaust gas 216 from an inlet 225 to an outlet 226 and through the substrate 224. The inlet 225 provides the fluid passageway for the flow of exhaust gas 216 into the eDOC device 223, and the outlet provides the fluid passageway for the flow of exhaust gas 216 out of the substrate device 224. In an embodiment, as depicted in FIG. 3A the eDOC assembly 219 includes the eDOC device 218.

Continuing with FIG. 3A, a first electrode 227 is electrically connected to a power source on the vehicle, with a first transmission wire (not shown). The first electrode 227 extends through the housing 221 of the eDOC assembly 219 and contacts the eDOC device 223 of the eDOC assembly 219. A second electrode 228 extends from the housing 221 of the eDOC assembly 219 and is also electrically connected as needed to complete the electrical circuit in a conventional manner. While the second electrode 228 extends from the housing, it is also possible that the second electrode 228 may contact the eDOC device 223 generally opposite the first electrode 227. When current is run to the first electrode 227, the current is isolated from the housing 221 and the current is directed to the eDOC device 223 of the eDOC assembly 219 exiting at the second electrode 228. In an embodiment the electrodes 227, 228 and portion of the eDOC device 223 may be a heating element, hereinafter denoted as heating element 223. In an embodiment the heating element 223 is a separate heating device from the substrate 224. It is also possible that the heating element 223 be all or a portion of the substrate 224 configured to generate heat with the application of an electrical current. It is possible that the selective introduction of current into the eDOC assembly 219 can be at the activation of a user or an automatic activation, such as by an engine control or emission control system 34.

When the current flows through the heating element 223, heat is generated in the eDOC assembly 219. The exhaust gases 216 that flow through the eDOC assembly 219 are heated by the heating element 223 and the heated exhaust gases 216 flow to/through the substrate 224, DOC device 218 (if separate), PF 222, and to the SCR device 220. At the eDOC assembly 219, DOC device 218 or the SCR device 220, the heated exhaust gases 216 provide sufficient heat to initiate regeneration of the filter as described herein. Moreover, by electrically heating the eDOC assembly 219, the PF 222 can be regenerated without having to increase the fuel loading on the ICE 24, which allows regeneration at low engine speed and low engine loading.

It should also be appreciated that while emission control system 34, as depicted in FIG. 1, is described with the eDOC device 223 located upstream of the DOC device 218, it is possible that if the eDOC device 223 achieves a sufficient exhaust gas temperature, that the emission control system 34 may include only the eDOC assembly 219 with integral eDOC devices 223 and catalyst 224, and no downstream DOC device 218. Further, it is possible that more than one eDOC device 223 can be used, as needed, to increase the temperature of the exhaust gas 216 and ensure efficient operation of the emission control system 34.

The emissions control system 34 may also include a reductant delivery system 232 that introduces the reductant 230 to the exhaust gas 216. The reductant delivery system 232 includes the reductant supply 234 and an injector 236. The reductant 230 is injected into the exhaust gas conduit 214 at a location upstream of the SCR device 220 using the injector 236, or other suitable method of delivery. The reductant supply 234 stores the reductant 230 and is in fluid communication with the injector 236. Accordingly, a selectable amount of reductant 230 corresponding to variable dosing rates may be injected into the exhaust gas conduit 214 such that the reductant 230 is introduced to the exhaust gas 216 at a location upstream of the SCR device 220. In one or more examples, the reductant 230 can be in the form of a gas, a liquid, or an aqueous solution, such as an aqueous urea solution. In one or more examples, the reductant 230 can be mixed with air in the injector 236 to aid in the dispersion of the injected spray. The SCR device 220 utilizes the reductant 230, such as ammonia ($NH_3$), to reduce the $NO_x$ levels in the exhaust gas 216.

In one or more examples, the emissions control system 34 further includes a control module 238 operably connected via a number of sensors to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute control process as described herein and one or more chemical model(s) 250, as described herein. The control module 238 can be operably connected to ICE system 24, SCR device 220, DOC device 218 and heating element 223 and/or one or more sensors. As shown, the sensors, can include an upstream $NO_x$ sensor 242a and downstream $NO_x$ sensor 242b, disposed downstream of SCR device 220, each of which are in fluid communication with exhaust gas 216 in the exhaust gas conduit 214. In one or more examples, the upstream $NO_x$ sensor 242a is disposed downstream of the ICE 26 and upstream of both SCR device 220 and the injector 236. The upstream $NO_x$ sensor 242a and the downstream $NO_x$ sensor 242b detect a $NO_x$ level proximate to their location within exhaust gas conduit 214, and generate a $NO_x$ signal, which corresponds to the NOx level. A NOx level can comprise a concentration, a mass flow rate, or a volumetric flow rate, in some embodiments. A NOx signal generated by a NOx sensor 242a, 242b can be interpreted by control module 238, for example. Control module 238 may also be in communication with one or more temperature sensors, such as upstream temperature sensor 244a (FIG. 3A), disposed at the eDOC assembly 219 as well as a second temperature sensor 244b disposed upstream from SCR device 220.

The sensors of the emissions control system 34 may further include at least one pressure sensor 246 (e.g., a delta pressure sensor). The delta pressure sensor 246 may determine the pressure differential (i.e., Δp) across the SCR device 220. Although a single delta pressure sensor 246 is illustrated, it is appreciated that a plurality of pressure sensors may be used to determine the pressure differential of the SCR device 220. It should be noted that in other examples, the sensors can include different, additional, or fewer sensors than those illustrated/described herein.

The control module (or a controller) 238 controls the operation of the ICE 24 and/or one or more components of the emission control system 34 based on sensed and/or modeled data to maintain efficient operation and low emissions. The data can be received from one or more of the several sensors NOx sensor 242a, 242b, temperature sensors 244a, 244b, and pressure sensor 246. In various embodiments, the sensed and/or modeled data include exhaust gas temperature, exhaust flow rates, soot loads, NOx concentrations, exhaust gas constituencies (chemical composition), differential pressures and many other parameters.

The control module 238 is configured to perform selected processes or operations based on the sensed and/or modeled data, such as controlling reductant dosing to maintain desired emissions, diagnosing the status of DOC device 218, the PF 222, as well as controlling the heating element 223 as needed to control the temperature of the exhaust gas 216 and to regenerate the PF 222. In an embodiment, the control module 238 determines whether one or more of the heating element 223, the or the PF 222 is operating properly based on whether the temperature difference is noted and/or reveals a temperature spike. In embodiments, the existence of a temperature spike is interpreted to mean that the zeolite component of one or more of the eDOC device 219, DOC device 218 and the PF 222 is storing hydrocarbons as expected.

It is to be noted that the diesel ICE 24 and emission control system 34 should not be limited to the configuration illustrated in FIG. 2. For instance, the various exhaust gas treatment devices, e.g., eDOC assembly 219, the PF 222, and SCR device 220 may be disposed in the exhaust system 30 in an order that is different than the depicted order. As an example, the SCR device 220 may be disposed downstream of the PF 222, and vice versa. Moreover, there may be more, less, or different exhaust gas treatment devices disposed in the emission control system 34 for example an underflow SCR device or additional particulate filters. For example, in some embodiments, as depicted, the SCR device and the PF 222 may be configured to be a single device (e.g., in a single canister). In other embodiments they may be two separate devices. Moreover, as another example, another DOC device 218 may be disposed between the SCR device 220 and the PF 222. In this case, additional sensors may be placed between the additional DOC device and the PF 222 as needed.

In one or more examples, the control module 238 uses the chemical model 250 of one or more of the heating element 223, DOC device 218, the PF 222, and the SCR catalyst to predict a status of the devices. For example, the HC concentration or NOx concentration in the exhaust gas 216 entering the eDOC assembly 219, or DOC device 218 and SCR device 220 respectively. Further, based on the sensed temperatures, predicted temperatures, predicted HC concentrations, and the like, the control module 238 determines whether the heating element 223, DOC device 218 and the PF 222 are properly operating and whether operation of the heating element 223 is needed. In addition, the control module based on sensed NOx, temperatures, exhaust flow, and pressure determines the amount of $NH_3$ with which to dose the exhaust gases 216 to satisfy selected emissions thresholds.

The control module 238 typically implements an adaptive closed loop control strategy to control the heating element 223 and/or addition of fuel to the exhaust gas 216 to maintain eDOC device 219, DOC device 218 and the PF 222 performance according to the chemical model 250, where the control module continuously learns one or more parameters associated with the chemical model 250 according to the ongoing performance of the ICE 24. Likewise, the control module 238 typically implements an adaptive closed loop control strategy to maintain SCR device 220 performance according to the chemical model 250, where the control module continuously learns one or more parameters associated with the chemical model 250 according to the ongoing performance of the ICE 24.

Figure 4:
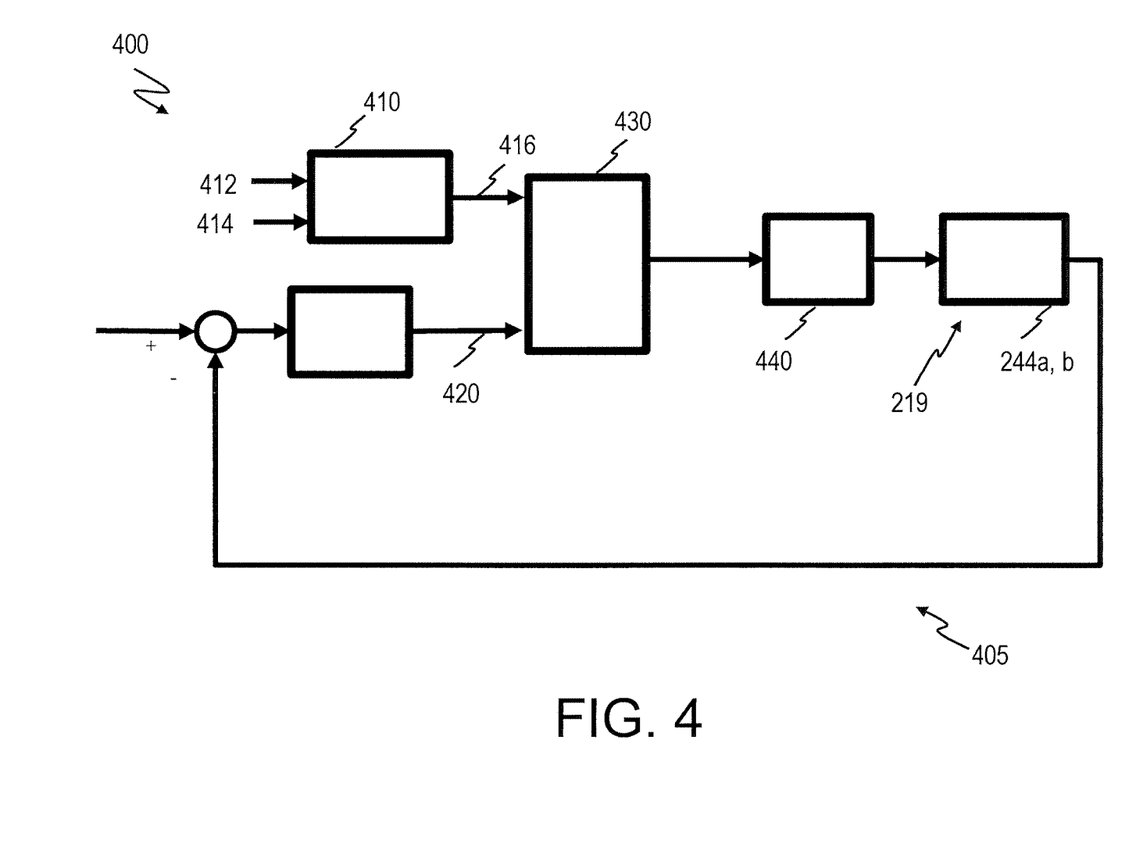
FIG. 4 illustrates a flowchart of an illustrative method for controlling an eDOC device.

FIG. 4 illustrates a flowchart of a conventional method 400 for controlling the activation of a heating element 223 to control the temperature of the exhaust gas 216. In this configuration a single control loop 405 is employed. This strategy is based on a control loop that calculates a required power 420 for the heating element 223 based on a target temperature and temperature feedback from the temperature sensor(s) 244a, 244b. A look-up table 410 facilitates calculation of the maximum power needed 416 for the heating element 223 taking in account the engine out temperature 412 and exhaust mass flow 414, and limiting the required power 420 coming from the control as depicted by block 430. The limit is employed because at times the maximum power required (to generate sufficient heating) would exceed the specifications and capabilities of the heating element 223 and potentially result in damage. For example, under conditions of low or zero exhaust gas flow excessive heating may result if too much power were applied to the heating element 223. Unfortunately, this constraint results in limitations on the power request for heating elements 223. Moreover, because generally the eDOC assembly 219 is typically designed and configured for steady-state operation of the diesel ICE 24, performance is limited during transient phases of engine 26 or emission control system 24 operation such as start-up where eDOC device 219 usage is advantageous to heat up the aftertreatment system as quickly as possible for efficient operation.

Continuing with FIG. 4, the control for the heating element 223 continues with the power command as limited based on heating element constraints by block 430 being converted to an applied power duty cycle at block 440. Therefore, because of these constraints on the application of the heating element 223, it would be advantageous to employ a control methodology that improves on this limitation to more accurately control the power applied to, and temperature of, the heating element and the eDOC assembly 219.

Figure 5:
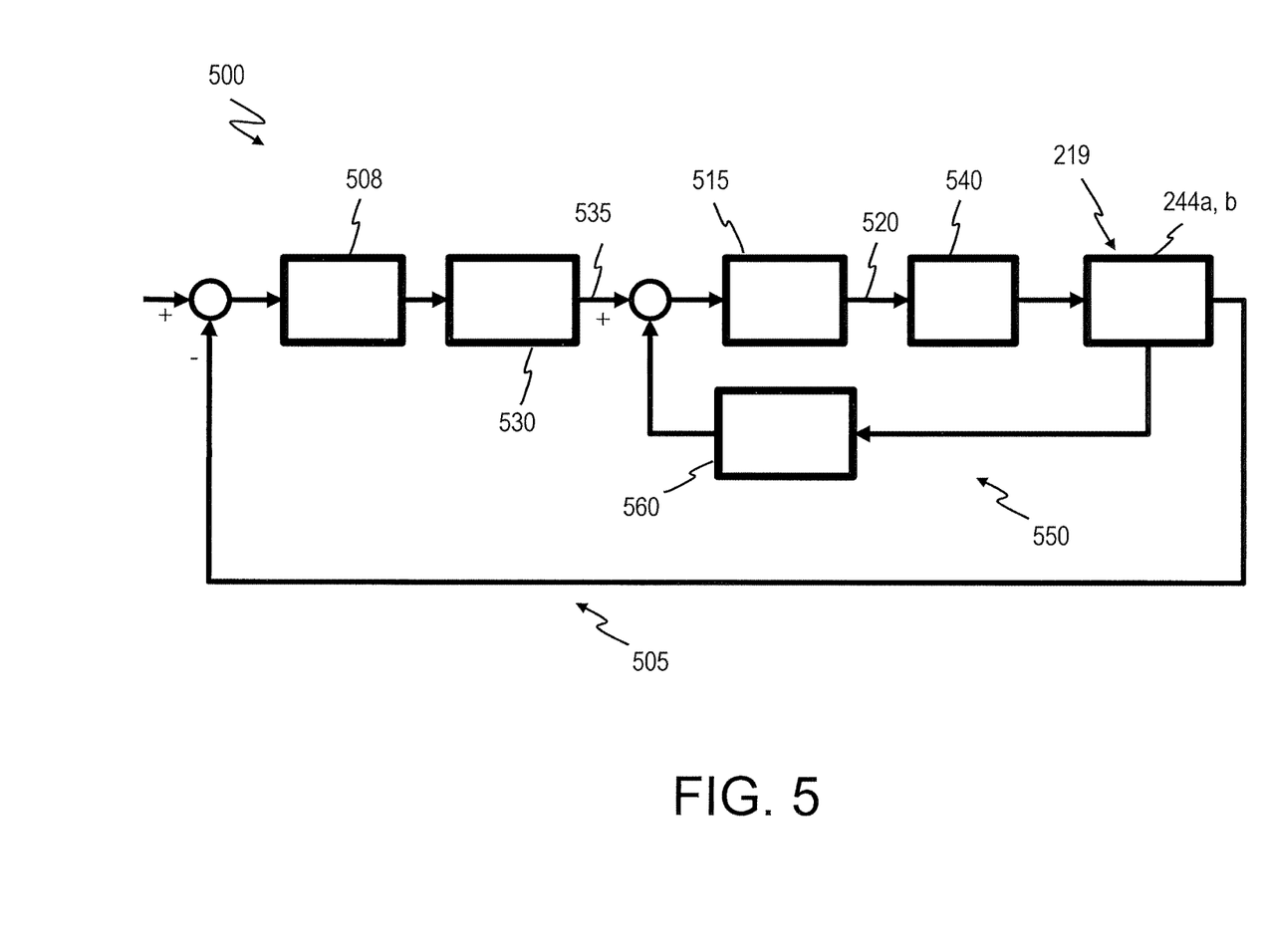
FIG. 5 illustrates a flowchart of an illustrative method for controlling an eDOC device in accordance with one or more embodiments.

FIG. 5 illustrates a flowchart of a method 500 for controlling the activation of the heating element 223 to control the temperature of the exhaust gas 216 in accordance with an embodiment. Advantageously, the described methodology exploits the differences in thermal capacity between the heating element 223 and the main catalyst 224 in the eDOC assembly 219, (or the DOC device 218, SCR device 220 and the PF 222). The former being about one tenth that of the latter. As such a control structure employing two nested control loops, an inner closed control loop and an outer closed control loop provides for improved control of the temperature and power applied to the heating element. In addition, because of the dynamic differences in the thermal characteristics of the heating element 223 when compared to the substrate (for example 224), the bandwidth, (and thereby response characteristics) of the two control loops are configured to be much different. For example in an embodiment the bandwidth of the inner closed control loop is of higher than that of the outer closed loop. In another embodiment the bandwidth of the inner closed control loop is at least twice that of the outer closed loop. In yet another embodiment the bandwidth of the inner closed control loop is at least five times that of the outer closed loop, while in still another embodiment the bandwidth of the inner closed control loop is at least ten times that of the outer closed loop. The method 500 is implemented by the controller 238, in one or more examples as described herein. Alternatively, the method 500 is implemented by one or more electric circuits. In one or more examples, the method 500 is implemented by execution of logic that may be provided or stored in the form of computer readable and/or executable instructions.

In an embodiment, the methodology 500 employs a model based approach with two nested control loops 505 and 550. This strategy is based on a fast responding inner control loop 550 that calculates the required power 520 for the heating element 223 and an outer control loop 505 configured to control the temperature of the heating element 223 and ultimately that of the exhaust gas 216. In an embodiment, the outer loop generates a desired temperature reference or command for the heating element 223 at 535. The inner control loop 550 employs a virtual sensor 560 that is a model emulation of the heating element 223 in the eDOC assembly 219. The control module 238 executes a model of the eDOC assembly 219 that determines, among other things, the temperature of the heating element 223 of the eDOC assembly 219 as a function of engine temperature, the flow of the exhaust gas 216, and the power applied to heating element 223. Power is determined as a function of the voltage applied to and current through the electrodes 227 and 228. Block 515 operates as the gain and control implementation for the control loop 550. In an embodiment, a proportional, integral, derivative (PID) control topology is employed to avoid wind up and improve dynamic response of the control loop. However, while a PID control topology is described, it should be understood that other configurations are envisioned and possible. For example, a proportional (P) controller, proportional integral (PI), proportional derivative PD, and the like. Once again similar to the process described above, the required power command for the heating element 223 as shown at 520 is directed converter 540 to establish a power duty cycle to be applied to the heating element 223 to achieve the desired heating. The control loop 550 is completed with the temperature sensor 244a, 244b measuring the temperature of the exhaust gases 216 for input to the virtual sensor 560.

Continuing with FIG. 5, the outer control loop 505 controls the heating element 223 power via a closed loop in order to ensure the desired temperature goals of a selected target temperature for the downstream exhaust gas 216 and substrates e.g., substrate 224 or the PF 222 based on the temperature measured by the temperature sensor(s) 244a, 244b and a predicted target temperature from a model for the eDOC assembly 219 and emission control system 34. This approach facilitates limiting local heater element 223 temperature in order to not exceed the hardware limitations and avoid damage.

Using a model based approach and dynamically estimating the heater element 223 temperature, a reference temperature for the downstream exhaust gas 216 and substrate 224 of the eDOC assembly 219 (or other devices downstream e.g., PF 222) is generated. The reference temperature for the downstream exhaust gas 216 and substrate is compared with temperature feedback from the temperature sensor(s) 244a, 244b to formulate a temperature command. Block 508 operates as the gain and control implementation for the control loop 505. In an embodiment, a proportional, integral, derivative (PID) control topology is employed to avoid wind up and improve dynamic response of the control loop. However, while a PID control topology is described, it should be understood that other configurations are envisioned and possible as described previously. The target temperature command is then directed to a limit function 530 as described above. However in the embodiments described the limit function 530 is simpler than that described with respect to FIG. 4. In this instance as the limit function is in the temperature based outer control loop 505, the limit function may be simplified to a maximum temperature and gradient for the heating element 223 of the eDOC assembly 219 to yield a target temperature for the heating element 223 at block 535. Advantageously, constraints regarding ICE operation engine temperatures and exhaust gas flow are not needed.

Advantageously with this control topology, the maximum power required (to generate sufficient heating) may be more accurately applied because of the differences in the response time. By having more direct control of the power to the heating element 223 of the eDOC assembly 219 with higher dynamic capability it can be ensured to provide improved temperature response for the emission control system without exceeding the specifications and capabilities of the heating element 223 and avoiding any potential damage. For example, under conditions of low or zero exhaust gas flow, power to the heating element 223 is directly controlled and the limitations described previously are avoided. In another example, at cold start-up, the control loop can now be operated to provide the power required to achieve the desired temperatures as needed with the slower temperature regulation loop ensuring device constraints are not exceeded. The control of the heating element 223 of the eDOC assembly 219 is now capable of more dynamic operation (beyond just the steady-state operation of the diesel ICE 24). As such, performance during transient phases of engine operation, are improved.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

One should note that FIGS. 4 and 5 show the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to illustrative embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle having an internal combustion engine, the emissions control system comprising:
    an electric diesel oxidation catalyst (eDOC) device having an electric heating element, disposed in a stream of the exhaust gas;
    a temperature sensor disposed at the eDOC device and configured to detect a temperature of the exhaust gas; and
    a controller that performs a model based control of the eDOC device based on a dual nested closed loop topology having an inner closed loop control and an outer closed loop control;
    wherein the inner closed loop control is configured to control power required for the eDOC device; and
    wherein the outer closed loop control is configured to control the temperature of the exhaust gas with the eDOC device.

2. The emissions control system of claim 1, further including another temperature sensor and an exhaust flow sensor.

3. The emissions control system of claim 1, wherein the inner closed loop control employs a virtual sensor for the heating element of the eDOC device responsive to at least a temperature of the engine and a flow of the exhaust gas.

4. The emissions control system of claim 1, wherein the inner closed loop control exhibits a bandwidth at least one of: higher than that of the outer closed loop; twice that of the outer closed loop; five times that of the outer closed loop; and ten times that of the outer closed loop.

5. The emissions control system of claim 1, wherein at least one of the inner closed loop control and the outer closed loop control employs at least one of a proportional control, proportional-integral control, proportional-derivative control, and a proportional-integral-derivative (PID) control.

6. The emissions control system of claim 1, wherein the outer closed loop control employs a limit function based on operational and performance constraints of the eDOC device.

7. The emissions control system of claim 6, wherein the operational and performance constraints include at least one of eDOC device temperature, its gradient, and flow of the exhaust gas.

8. The emission control system of claim 1, wherein at least one of the inner closed loop control and the outer closed loop control is configured to permit operation of the eDOC device independent of a flow of the exhaust gas.

9. The emissions control system of claim 1, wherein the eDOC device includes an electric heater integrated with a diesel oxidation catalyst in a single assembly.

10. The emissions control system of claim 1, further including a particulate filter located in the exhaust gas, downstream, of the eDOC device.

11. The emissions control system of claim 1, further including a selective catalyst reduction (SCR) device and a NOx sensor disposed in the exhaust gas downstream from the eDOC device.

12. The emissions control system of claim 11, wherein the eDOC device is configured to regenerate at least one of the eDOC device, a DOC device, a particulate filter, and an SCR device.

13. The emissions control system of claim 12, wherein at least two of the eDOC device, DOC device, particulate filter and SCR device are integrated in a single assembly.

14. An exhaust system for treating exhaust gas emitted by an internal combustion engine, the exhaust system comprising:
    an electric diesel oxidation catalyst (eDOC) device having an electric heating element, disposed in a stream of the exhaust gas of the internal combustion engine;
    a temperature sensor disposed at the eDOC device and configured to detect a temperature of the exhaust gas; and
    a controller that performs a model based control of the eDOC device based on a dual nested closed loop topology having an inner closed loop control and an outer closed loop control;
    wherein the inner closed loop control is configured to control power required for the eDOC device; and
    wherein the outer closed loop control is configured to control the temperature of the exhaust gas with the eDOC device.

15. A computer-implemented method for controlling an electric oxidation catalyst (eDOC) device of an exhaust system of an internal combustion engine, the method comprising:
    measuring an exhaust gas temperature associated with the eDOC device;
    performing a model based control of the eDOC device based on a dual nested closed loop topology having an inner closed loop control and an outer closed loop control comprising:
    configuring the inner closed loop to control a power required for the eDOC device; and
    configuring the outer closed loop to control the temperature of the exhaust gas with the eDOC device; and
    generating a command to the eDOC device based on the performing.

16. The method of claim 15, wherein the inner closed loop control further includes employing a virtual sensor for a heating element of the eDOC device responsive to at least a temperature of the engine and a flow of the exhaust gas.

17. The method of claim 15, wherein the inner closed loop control exhibits a bandwidth at least one of: higher than that of the outer closed loop; twice that of the outer closed loop; five times that of the outer closed loop; and ten times that of the outer closed loop.

18. The method of claim 15, wherein at least one of the inner closed loop control and the outer closed loop control is configured to permit operation of the eDOC device independent of a flow of the exhaust gas.

19. The method of claim 15, further including regenerating at least one of the eDOC device, a DOC device, a particulate filter, and an SCR device.

20. The method of claim 15, further including the outer closed loop control employing a limit function based on operational and performance constraints of the eDOC device.

* * * * *